United States Patent
Almazán Campillay et al.

(10) Patent No.: US 12,320,146 B2
(45) Date of Patent: Jun. 3, 2025

(54) COMPOSITE SLIDING BLOCK FOR FRICTIONAL-TYPE SEISMIC ISOLATORS AND SEISMIC ISOLATORS WITH SAID COMPOSITE SLIDING BLOCK

(71) Applicant: PONTIFICIA UNIVERSIDAD CATÓLICA DE CHILE, Santiago (CL)

(72) Inventors: José Luis Almazán Campillay, Santiago (CL); Gaspar Andrés Auad Alvarez, Santiago (CL); Diego Marcelo Quizanga Martinez, Santiago (CL)

(73) Assignee: PONTIFICIA UNIVERSIDAD CATÓLICA DE CHILE, Santiago (CL)

( * ) Notice: Subject to any disclaimer, the term of this patent is extended or adjusted under 35 U.S.C. 154(b) by 201 days.

(21) Appl. No.: 18/011,979

(22) PCT Filed: Jun. 24, 2020

(86) PCT No.: PCT/CL2020/050064
§ 371 (c)(1),
(2) Date: Dec. 21, 2022

(87) PCT Pub. No.: WO2021/258224
PCT Pub. Date: Dec. 30, 2021

(65) Prior Publication Data
US 2023/0243175 A1    Aug. 3, 2023

(51) Int. Cl.
*E04H 9/02*    (2006.01)
*C08L 7/00*    (2006.01)
(Continued)

(52) U.S. Cl.
CPC .............. *E04H 9/021* (2013.01); *C08L 7/00* (2013.01); *C08L 23/06* (2013.01); *C08L 27/18* (2013.01);
(Continued)

(58) Field of Classification Search
CPC ....... E04H 9/021; E02D 27/34; E01D 19/046; C08L 7/00; C08L 23/06; C08L 27/18; C08L 2207/068; C22C 38/00
(Continued)

(56) References Cited

U.S. PATENT DOCUMENTS

| 4,320,549 A | * | 3/1982 | Greb | ..................... E01D 19/046 52/167.9 |
| 5,081,806 A | * | 1/1992 | Pommelet | ............... E02D 27/34 52/167.5 |

(Continued)

FOREIGN PATENT DOCUMENTS

| CL | 2016002647 U1 | 12/2016 |
| CN | 202298449 U | 7/2012 |

(Continued)

OTHER PUBLICATIONS

European search report for EP 20942361.5, mailed on Feb. 13, 2024.
PCT search report for PCT/CL2020/050064, mailed on Dec. 4, 2020.

*Primary Examiner* — James M Ference
(74) *Attorney, Agent, or Firm* — Frank Gao, Esq.

(57) ABSTRACT

A composite sliding block to be arranged between two supporting plates of a frictional-type seismic isolator, with one supporting plate connected to the superstructure to be isolated and the other to the foundations, comprising two contact components that externally are slidingly or articulatedly in contact with said supporting plates, depending on whether the isolator has one or two sliding surfaces, and (Continued)

internally are coupled to each other by means of a male projection of one component in a female recess of the other. An elastomeric seal occupies an empty space surrounding the projection within the recess and, on the external side of the contact component(s) slidingly in contact with the supporting plate(s), a sliding plate is accommodated in a corresponding niche having an elastomeric compression support at the bottom. Frictional pendulum-type isolators with one or two concave sliding surfaces include such a block.

11 Claims, 7 Drawing Sheets

(51) Int. Cl.
  *C08L 23/06* (2006.01)
  *C08L 27/18* (2006.01)
  *C22C 38/00* (2006.01)
(52) U.S. Cl.
  CPC ........ *C22C 38/00* (2013.01); *C08L 2207/068* (2013.01)
(58) Field of Classification Search
  USPC .......................................... 52/167.1
  See application file for complete search history.

(56) References Cited

U.S. PATENT DOCUMENTS

| | | | |
|---|---|---|---|
| 5,597,240 A | 1/1997 | Fyfe | |
| 6,021,992 A * | 2/2000 | Yen | F16F 7/08 248/560 |
| 6,321,492 B1 * | 11/2001 | Robinson | F16F 7/015 52/167.6 |
| 6,688,051 B2 * | 2/2004 | Tsai | E04H 9/023 52/167.7 |
| 7,814,712 B2 * | 10/2010 | Tsai | E04H 9/023 52/167.4 |
| 8,011,142 B2 * | 9/2011 | Marioni | E04H 9/021 248/560 |
| 8,371,075 B2 * | 2/2013 | Huber | F16C 33/201 52/167.1 |
| 8,484,911 B2 * | 7/2013 | Zayas | E04H 9/021 248/562 |
| 9,175,468 B1 * | 11/2015 | Tsai | E01D 19/04 |
| 9,435,087 B2 * | 9/2016 | Kim | E01D 19/046 |
| 9,556,609 B2 * | 1/2017 | Nakamura | E04H 9/0215 |
| 10,501,899 B2 * | 12/2019 | Braun | E04H 9/021 |
| 10,767,384 B2 * | 9/2020 | Wakita | E04B 1/36 |
| 2003/0094560 A1 * | 5/2003 | Tsai | E04H 9/021 248/618 |
| 2005/0241245 A1 * | 11/2005 | Tsai | E04H 9/023 52/167.1 |
| 2006/0174555 A1 * | 8/2006 | Zayas | E04H 9/021 52/167.4 |
| 2006/0272226 A1 * | 12/2006 | Robinson | E01D 19/04 52/167.4 |
| 2007/0157532 A1 * | 7/2007 | Tsai | E04H 9/023 52/167.1 |
| 2009/0188179 A1 * | 7/2009 | Huber | F16C 23/043 52/167.7 |
| 2010/0095608 A1 * | 4/2010 | Marioni | E04H 9/021 52/167.4 |
| 2011/0016805 A1 * | 1/2011 | Tsai | F16F 15/021 52/167.1 |
| 2012/0174500 A1 * | 7/2012 | Yakoub | E04B 1/98 52/167.6 |
| 2013/0148917 A1 | 6/2013 | Chuang | |
| 2014/0026498 A1 * | 1/2014 | Quaglini | E04H 9/021 52/167.4 |
| 2015/0191881 A1 * | 7/2015 | Kim | E01D 19/046 384/36 |
| 2018/0142734 A1 * | 5/2018 | Gai | F16C 23/043 |
| 2018/0195267 A1 * | 7/2018 | Massa | E04B 1/36 |
| 2019/0368138 A1 * | 12/2019 | Weber | E01D 19/046 |
| 2020/0123799 A1 * | 4/2020 | Villano | E04B 1/36 |
| 2020/0141148 A1 * | 5/2020 | Wakita | E04B 1/98 |
| 2023/0243175 A1 * | 8/2023 | Almazán Campillay | C08L 23/06 52/167.1 |

FOREIGN PATENT DOCUMENTS

| | | |
|---|---|---|
| CN | 205 741 89 U | 11/2016 |
| CN | 104343186 B | 1/2017 |
| CN | 106545210 A * | 3/2017 |
| CN | 111021238 A * | 4/2020 |
| DE | 102005060375 A1 | 6/2007 |
| EP | 0943736 A2 * | 9/1999 |
| JP | 2007132044 A | 8/2011 |
| JP | 2014025578 A | 6/2014 |
| JP | 2015-30993 A | 2/2015 |
| KR | 100917093 B1 | 9/2009 |
| KR | 101350883 B1 * | 1/2014 |
| KR | 101438704 B1 * | 9/2014 |
| TW | M426684 U * | 4/2012 |
| WO | WO-2015136457 A1 * | 9/2015 |

* cited by examiner

COMPOSITE SLIDING BLOCK FOR FRICTIONAL-TYPE SEISMIC ISOLATORS AND SEISMIC ISOLATORS WITH SAID COMPOSITE SLIDING BLOCK

FIELD OF THE INVENTION

The invention refers to friction-type seismic isolators, used mostly in the foundations of structures and buildings to isolate them against large-magnitude earthquakes. More specifically, the invention relates to an improved sliding block for this type of isolator and to a friction-type seismic isolator comprising said slider.

STATE OF THE ART

Friction-type seismic isolators function as sliding bearings, dissipating energy through friction between the components of the device, thus allowing to control the amplitude of the movement.

Depending on the geometric shape of the sliding surface, these devices can be classified as flat and concave, due to the shape of the sliding surface. In turn, each of them can have one or more sliding surfaces. These devices are designed to function as fixed supports under the action of gravitational and service forces. Only under the action of large seismic forces does relative motion occur along the sliding surface(s). Two types of forces are generated on each sliding surface: (i) forces perpendicular to such surfaces, generically referred to as normal reactions; and (ii) friction forces parallel to such surfaces. In flat devices the normal reactions are always vertical while in concave devices they change direction depending on the relative sliding, producing a self-centering effect.

It is evident that flat devices are simpler and cheaper than concave devices but they have the disadvantage that they lack self-centering action. As a consequence, both the maximum displacement and the post-earthquake residual displacement are of greater magnitude and more difficult to estimate relative to that of concave devices.

Among the concave-type devices the best known is the so-called friction pendulum or FPS (Friction Pendulum Systems). They are characterized by having one or more sliding surfaces with a constant radius of curvature. Therefore, during a large earthquake, the structure describes a pendular movement, hence its name.

There are several types of FPS devices, which can be classified according to two criteria: (a) according to the shape of the sliding surface(s); and (b) according to the number of phases of their force-displacement relationship. Following the first criterion, there are two groups: (i) friction pendulums with spherical sliding surface(s); and (ii) friction pendulums with cylindrical sliding surface(s). Following the second criterion, there are in turn two sub-groups: (i) single-phase friction pendulums; and (ii) multi-phase friction pendulums. Therefore, there are four types of friction pendulum isolators, which we shall hereinafter refer to as follows: (1) Single Phase Spherical (1P-S-FP); (2) Multi-Phase Spherical (MP-S-FP); (3) Single Phase Cylindrical (1P-C-FP); and (4) Multi-Phase Cylindrical (MP-C-FP).

Among the 1P-S-FP type devices, the best known are the simple-curvature friction pendulum (see FIG. 1, which corresponds to FIG. 9 of document US 2006/0174555 A1) and the double-curvature friction pendulum (see FIG. 2, which is representative of the type of devices supplied by Maurer Earthquake Protection Systems, www.maurer.eu or by Oiles Company, www.oiles.co.jp). The first one comprises a first support plate with a single spherical sliding surface, joined to one between the structure to be seismically isolated and the foundations, a second support plate joined to the other between the structure to be seismically isolated and the foundations, and a central sliding block, also simply called slider. The slider has on one side a spherical surface which is in sliding contact with said spherical sliding surface and is of opposite curvature thereto, while on the opposite side it is connected in articulated manner to the second support plate. In the second device both support plates have spherical sliding surfaces and the slider has spherical surfaces which are in sliding contact and have an opposite curvature to said spherical sliding surfaces of the plates. The sliding surfaces of the support plate(s), as well as the sliding contact surfaces of the slider, are made of a material with a low friction coefficient. The radius of curvature and the friction coefficient of the sliding surfaces of the support plates and the slider can be the same or different from each other. Additionally, it is important to highlight that in the double-curvature device, despite having two sliding surfaces, it only has one force-displacement relationship phase, that is, sliding occurs simultaneously on both surfaces.

Among the MF-S-FP type devices, the best known are the double-curvature friction pendulum with internal ball joint, and the Triple Friction Pendulum Bearing (TFPB). The first one is similar to the double-curvature friction pendulum shown in FIG. 2, but the slider has a low-friction internal ball joint, which enables it to activate a single sliding surface or both sliding surfaces at the same time (see FIG. 3, which corresponds to FIG. 10 of document US 2006/0174555 A1). Two phases of behaviour are possible in this device. The second device has four sliding surfaces and works as a double-curvature friction pendulum disposed within a larger one (see FIG. 4, which corresponds to FIG. 1 of document US 2006/0174555 A1). In its most common embodiment, the radii of curvature and friction coefficient of the inner pendulum of the latter device are the same, while the radii of curvature and the friction coefficient of the outer sliding surfaces may be the same or different. By properly selecting said parameters, one or more sliding surfaces can be activated. Three phases of behaviour are typically activated, hence its name.

Among the 1P-C-FP type devices, one of the best known is the so-called Bidirectional Cylindrical Pendulum Bearing. This device has the same elements as a double-curvature friction pendulum but where the sliding surfaces are concave cylindrical surfaces that face each other and orthogonally cross each other and instead of a slider it has two articulated sliders, one upper and one lower slider, located between the upper and lower support plates.

A device is also known that has the same operating principle and name as the previous one but which both withstands compression and is tension capable.

Finally, the MP-C-FP type devices work as two (or more) 1P-C-FP arranged one inside another larger one.

Due to their characteristics, the FPS-type seismic isolators are applied to a wide variety of structures, be they buildings, bridges or infrastructure works in genera, as well as light structures and industrial equipment. Like other seismic isolation devices, they can be placed on the foundations or at an intermediate level of the structure.

Despite the wide variety of FPS-type devices described above, none of them have built-in mechanisms to protect their integrity in the event of an impact in the lateral direction. In some of the aforementioned devices the sliding surfaces have a peripheral metal flange, which acts as an impact barrier when the maximum displacement is reached.

However, it is well known that lateral impact can cause significant inelastic deformations in the structure, which can even collapse under certain conditions. One case that requires special attention is the possibility of impact due to foundation failure, such as differential settlement of the soil and/or liquefaction.

Another problem is that the FPSs normally used do not have a mechanism to attenuate the vertical impact produced by the possible lifting of the isolator. This phenomenon may occur due to the following causes, which may be simultaneous: (i) large overturning moments in slender structures; (ii) combined effect of large horizontal and vertical ground accelerations; (iii) large overturning moments caused by lateral impact.

On the other hand, in multi-phase devices the change from a flexible to a rigid phase implies a sudden increase in lateral forces, which produces unwanted increases in accelerations and deformations of the structure. A possible solution so that the increases in rigidity are not sudden but smooth and continuous and may thus allow for lateral impact on the structures to be mitigated, is to use sliding surfaces where the radius of curvature is variable, increasing with displacement (for example, surfaces with an ellipsoidal profile). This requires, however, the introduction of elements between the sliding surfaces and the slider's contact surface that allow to accommodate the changes in curvature and in this way avoid the concentration of stresses on the surfaces that are in contact with each other.

SUMMARY OF THE INVENTION

To overcome the aforementioned deficiencies, the present invention proposes a composite sliding block for friction-type seismic isolators which are mounted between a superstructure and a substructure or foundations, in which the sliding block provides the isolator with high resilience to both horizontal and vertical impact.

The composite sliding block of the invention is characterized by incorporating energy dissipation elements that are activated when the impact occurs either in the horizontal or the vertical direction. In addition, the axially flexible elements that are incorporated to attenuate the effect of vertical impact allow in turn to reduce the concentration of stresses that occurs when sliding surfaces of variable curvature are used (for example, elliptical surfaces). However, the composite sliding block can be used in friction-type devices having flat sliding surfaces as well as friction-type devices having curved sliding surfaces.

In accordance with the above, the composite sliding block of the invention is configured to be arranged between the two support plates of a friction-type seismic isolator with either a single sliding surface or double sliding surface and it is made up of two parts or contact components arranged one above the other. Each contact component has an external side in respective contact with one of the support plates and internal sides facing each other. Specifically, the external side of one of the two contact components is in sliding contact with a corresponding sliding surface on one of the support plates, while the external side of the other contact component is either slidingly or articulatedly in contact with the other support plate, depending on whether the seismic isolator has one or two sliding surfaces.

On the other hand, on their internal side, the two contact components are coupled to each other in omnidirectionally sliding fashion by means of the introduction of a vertical male coupling projection of one of the contact components in a shape-matching but of larger cross-sectional area female coupling hollow out or recess of the other contact component. In this way, when the horizontal impact occurs on the seismic isolator, a relative displacement is induced between the contact components.

The contact surfaces between the two contact components, that is, the bottom of the recess and the end of the projection, are perfectly flat and, in order to prevent these surfaces from adhering, a thin non-adhering sheet is disposed at the bottom of the recess (typically of between 1 mm and 2 mm in thickness).

High friction forces are generated at the interface between both contact components, as a result of the high friction coefficient between the material of the non-stick sheet and the upper component. For this reason, this interface between the two contact components will be referred to as the high-friction interface.

The space surrounding the male coupling projection within the female coupling recess left by the disparate coupling in terms of cross-sectional surface of the contact components, is occupied by an elastomeric seal that is capable of laterally being compressed by the effect of the relative displacement between the two contact components. This seal has triple functionality: (i) it prevents metal-to-metal impact; (ii) it generates a self-centering force that tends to decrease the residual deformation at the high-friction interface; and (iii) it dissipates energy.

The value of the friction coefficient and the width of the seal (or space surrounding the male coupling projection) are defined by the amount of energy that is desired to be dissipated during the lateral impact.

The composite sliding block further comprises a low-friction sliding plate located on the external side of the contact component(s) which is/are respectively in sliding contact with the support plate(s), the sliding plate exerting said sliding contact and being arranged in close-fitting fashion in a corresponding niche on said external side of the contact component. An elastomeric compression support is arranged between the low friction sliding plate and the bottom of the niche in a confined manner and with a certain margin of empty space within the niche in order to be able to deform and occupy said space by the effect of a vertical load applied to the isolator. Although elastomers are nearly incompressible materials, the axial deformation of the elastomeric compression support is due to the volume of the empty space that is (intentionally) left within the niche. Once mounted, this ability to axially deform is activated only when the isolator tends to lift, thus acting as a post-lift impact shock absorber.

For isolators with flat sliding surfaces, the outer faces of the sliding plates are also flat. For isolators with concave spherical sliding surface, said faces are preferably convex spherical with the same radius of curvature as the spherical sliding surfaces of the support plates. For isolators with concave, but not spherical, sliding surfaces, it is convenient that the outer faces of the sliding plates be convex spherical with a radius of curvature equal to the radius of curvature of the sliding surfaces in the non-displaced position. However, in the case of generally concave sliding surfaces, whether or not they are spherical, it is also possible for the outer faces of the sliding plates to be flat. This is due to the fact that the low bending stiffness of both the sliding plate and the elastomeric compression support allows the former to adopt the curvature of the sliding surface, which can be considered as non-deformable.

The material of the contact components of the composite sliding block is steel, while the elastomeric compression supports and elastomeric seals are preferably made of high-damping natural rubber, typically used in HDRB (High Damping Rubber Bearing) type seismic isolators. The material of the non-adhering sheet is chosen between an appropriate metal or non-metal in order to obtain a friction coefficient of between 0.20 and 0.50, and a high resistance to abrasion. Finally, the low-friction sliding plates are preferably made of polymeric materials, such as polytetrafluoroethylene (PTFE) or ultra-high molecular weight polyethylene (UHMWPE), which is why we will hereinafter refer to them as polymeric plates.

In a second embodiment of the invention, the composite sliding block described in the preceding paragraphs forms part of a friction pendulum-type seismic isolator with double concave sliding surfaces that is mounted between a superstructure and a substructure or foundations, wherein the isolator comprises:
- an upper support plate joined at the top to the structure and provided at the bottom with a concave sliding surface; and
- a lower support plate joined at the bottom to the foundations and provided at the top with a concave sliding surface;

wherein the composite sliding block is located between the upper and lower support plates and in sliding contact with the respective concave sliding surfaces thereof.

Preferably in this case the concave sliding surfaces are of variable curvature, for example elliptical, to provide the isolator with an adaptive isolation mechanism that renders it stiffer, in a smoother fashion, as the displacement increases and, in this way, achieve better performance against extreme displacements of the isolator under large magnitude earthquakes. In addition, the plates of the isolator preferably have containment flanges, usually made of metal, located on the periphery of the concave sliding surfaces, the purpose of which is to act as a lateral impact barrier.

In a third embodiment of the invention, the composite sliding block described in the preceding paragraphs forms part of a friction pendulum-type seismic isolator with a single concave sliding surface. In this case, the seismic isolator comprises:
- a first support plate connected to one of the superstructure and the substructure or foundations, wherein the support plate has at least one central portion with a concave spherical surface; and
- a second support plate with one side joined to the other between the superstructure and the substructure or foundations, and an opposite side provided with said single concave sliding surface;

wherein the composite sliding block is located between the first support plate and the second support plate and has, on the external side of one of the contact components, a spherical cap for articulated (rotary) contact with said at least one central portion with a concave spherical surface of the first support plate and wherein the other contact component is in sliding contact with the concave sliding surface of the second support plate.

Preferably, the first support plate is composed of a flat connecting plate that is joined to one between the superstructure and the substructure or foundations and a protruding intermediate plate joined to the flat connecting plate, wherein the protruding intermediate plate has an end provided with said at least one central portion with a concave spherical surface of the support plate. The connecting plate and the intermediate plate are preferably attached to each other by welding, but can also be manufactured in one piece.

Alternatively, the first support plate may not have this configuration but instead have said at least one central portion with a spherical concave surface formed in a recess in the first plate itself.

DESCRIPTION OF THE DRAWINGS

FIG. 10 shows in detail the composite sliding block of the invention in a cross-sectional view along its vertical plane of symmetry, in the situation that the seismic isolator of FIG. 9 is in.

FIG. 12 shows in detail the composite sliding block of the invention in a cross-sectional view along its vertical plane of symmetry, in the situation in which the seismic isolator of FIG. 11 is in.

FIG. 14 shows in detail the composite sliding block of the invention in a cross-sectional view along its vertical plane of symmetry, in the situation in which the seismic isolator of FIG. 13 is in.

DETAILED DESCRIPTION OF THE INVENTION

Figure 5:
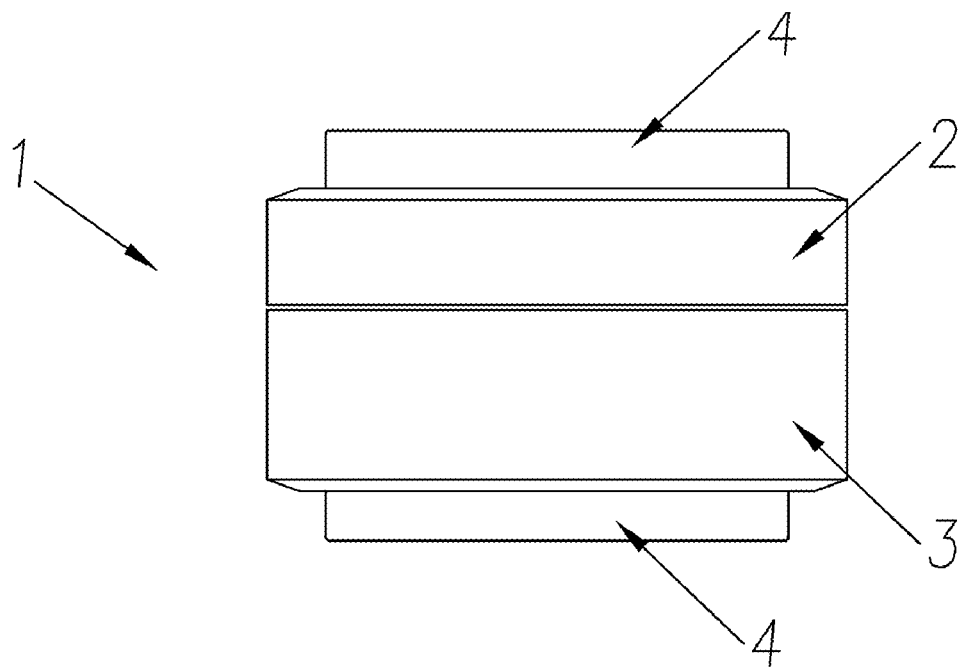
FIG. 5 represents an elevation view of a preferred embodiment of the invention constituted by a composite sliding block for a double sliding surface friction-type seismic isolator, in which the composite sliding block is disposed in an unloaded condition, that is to say, before the seismic isolator is mounted between a superstructure and a substructure or foundations.
Figure 6:
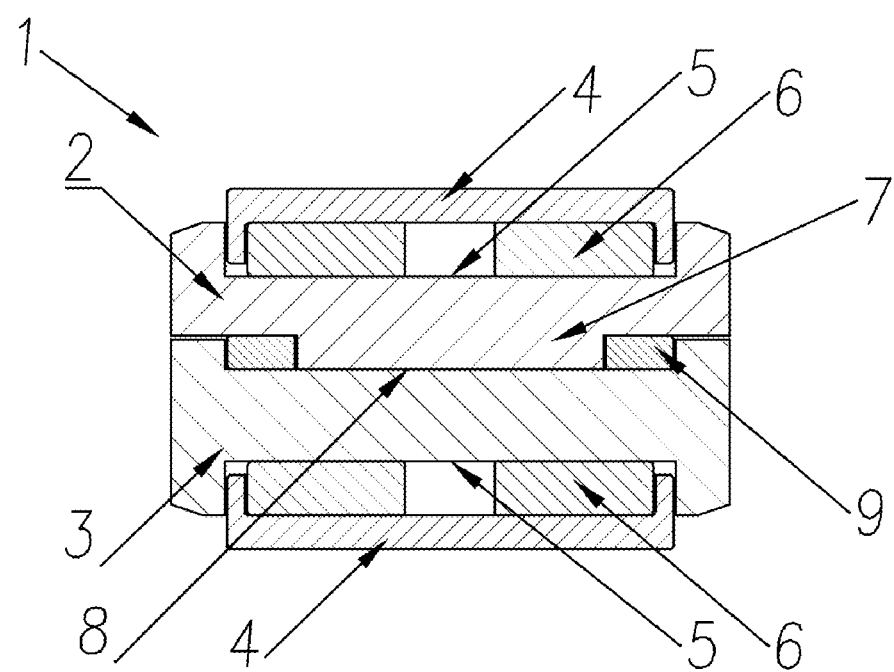
FIG. 6 is a cross-sectional view along the vertical plane of symmetry of the composite sliding block of FIG. 5.
Figure 7:
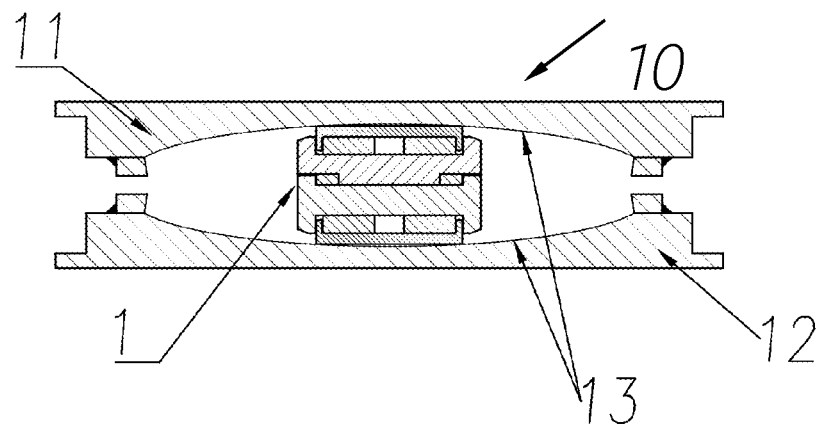
FIG. 7 represents a cross-sectional view along the vertical plane of symmetry a seismic isolator of double sliding surface, both of them concave, with the composite sliding block of FIGS. 5 and 6.
Figure 8:
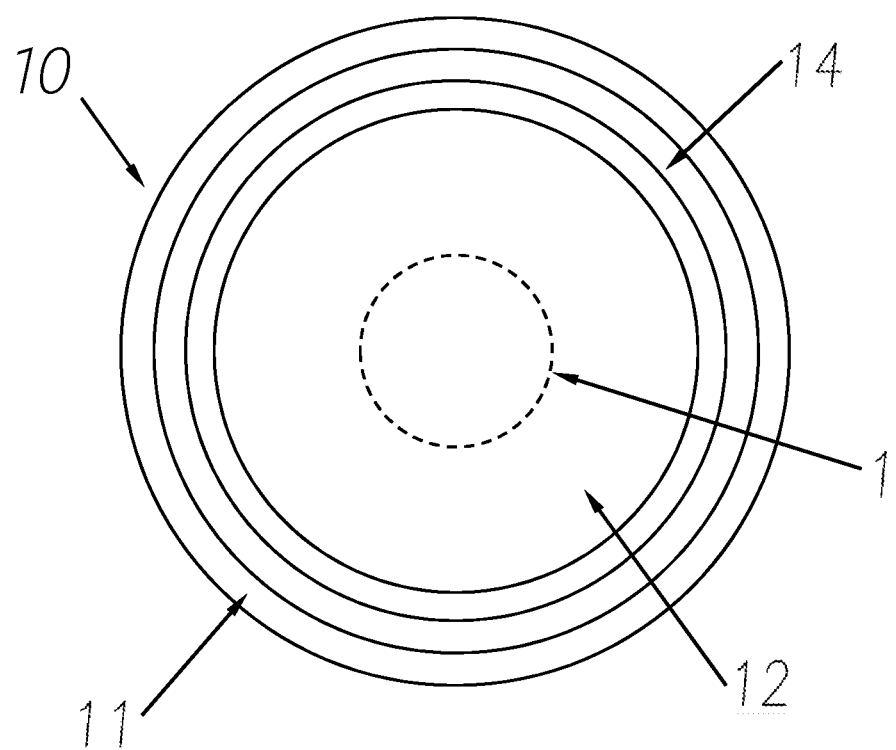
FIG. 8 is a plan view of the whole seismic isolator of FIG. 7 showing in broken lines the outline of the sliding surfaces of the support plates and the outline of the composite sliding block.

According to the preferred embodiment of the invention illustrated in FIGS. 5 and 6, the composite sliding block (1) conveniently has a general cylindrical shape and is made up of two contact components arranged one above the other, which we will herein refer to as the upper contact component (2) and lower contact component (3).

The composite sliding block is configured in this case for use in a double sliding surface friction-type seismic isolator, whereby the contact components have sliding plates of polymeric material (4) on their external side for respective sliding contact with the sliding surfaces of the support plates of the seismic isolator. The polymeric plates (4) have a circular shape and are close-fittingly accommodated in a respective cylindrical niche (5) machined on the corresponding external side of the contact component. The contact surfaces of the polymeric plates with the sliding surfaces of the isolator are flat and can also be convex spherical for a better adjustment to said sliding surfaces. In addition, each polymeric plate (4) rests on an elastomeric compression support (6) in the form of a ring that is centered within each niche.

On the other hand, the contact components (2, 3) are omnidirectionally slidingly coupled to each other through their facing internal sides, by means of a vertical cylindrical male coupling projection (7) of the upper contact component (2) inserted in a corresponding female coupling recess (8) of the lower contact component (3) that has the same shape but is of larger cross-sectional area.

At the contact interface between the male coupling projection (7) and the female coupling recess (8) the surfaces are both flat and horizontal, the female coupling recess having a bottom and side walls so that in said bottom there is arranged a sheet of thin non-adhering material (not distinguishable in the figures), to prevent these surfaces from adhering. In addition, the empty space surrounding the male coupling projection that is generated at the coupling between both contact components allows to insert a ring-shaped elastomeric seal (9) that prevents metal-to-metal impact when relative lateral displacement occurs between the upper contact component (2) and the lower contact component (3).

In the following figures (FIGS. 7, 8, 9, 11, 13 and 15) the composite sliding block of FIGS. 5 and 6 is illustrated, specifically being mounted on a friction-type seismic isolator (10) with double concave sliding surface (13), wherein the following elements are distinguished:

an upper support plate (11) having an upper side joined by bolts to a superstructure (not shown) and a lower side provided with one of the concave sliding surfaces of the seismic isolator;

a lower support plate (12) having a lower side joined by bolts to the substructure or foundations (not shown) and an upper side provided with the other of the concave sliding surfaces (15) of the seismic isolator; and the composite sliding block (1) located between the upper support plate (11) and the lower support plate (12) and in sliding contact with the respective concave sliding surfaces (13).

Figure 9:
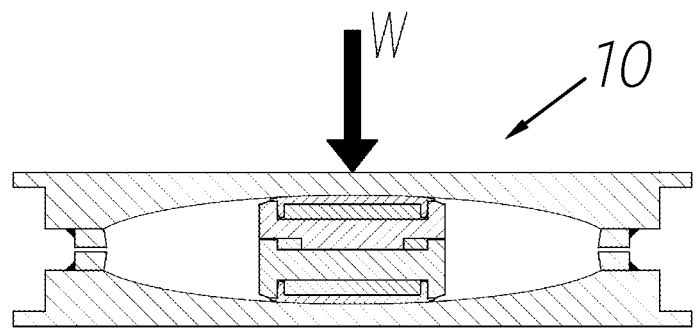
FIG. 9 is equivalent to FIG. 7 when the seismic isolator is in a centered position under a vertical load W.
Figure 10:
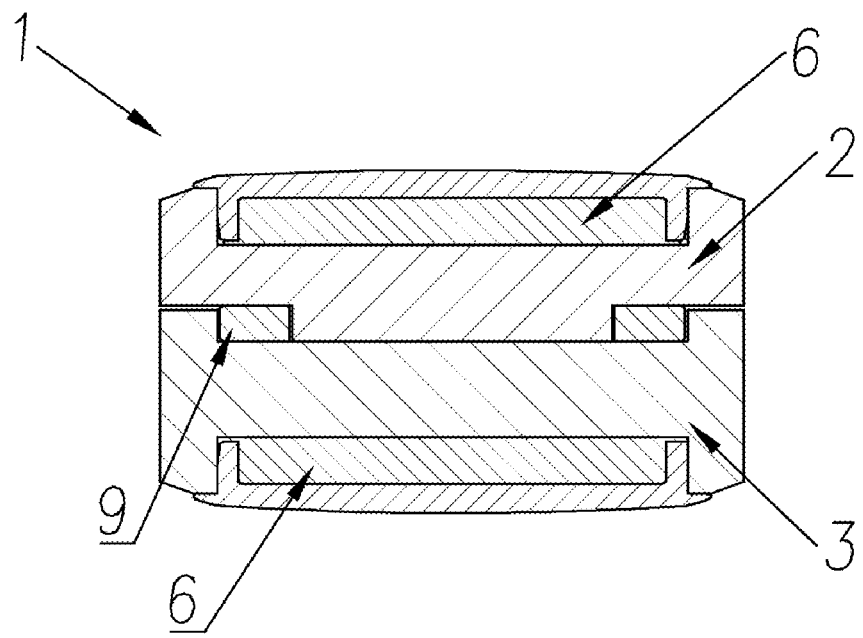

As can be seen in FIGS. 9 and 10, when the structure is subjected to a vertical load W, the elastomeric compression supports deform until they occupy all the empty spaces of the niches, thus remaining completely confined between the polymeric plate and the lateral walls and bottom of the niches. In this way, it acts as an element that absorbs the impact in the vertical direction, dissipating energy due to deformation of the elastomeric compression support.

Figure 11:
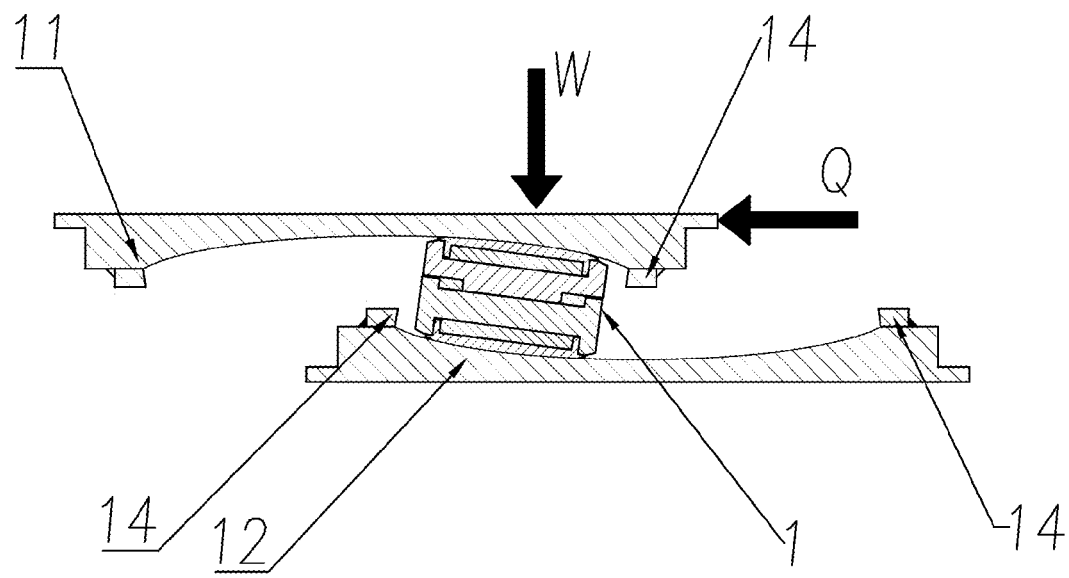
FIG. 11 is equivalent to FIG. 9 when the seismic isolator is in a displaced position due to being further subjected to a horizontal load Q, prior to the condition in which it impacts against the containment flanges.
Figure 12:
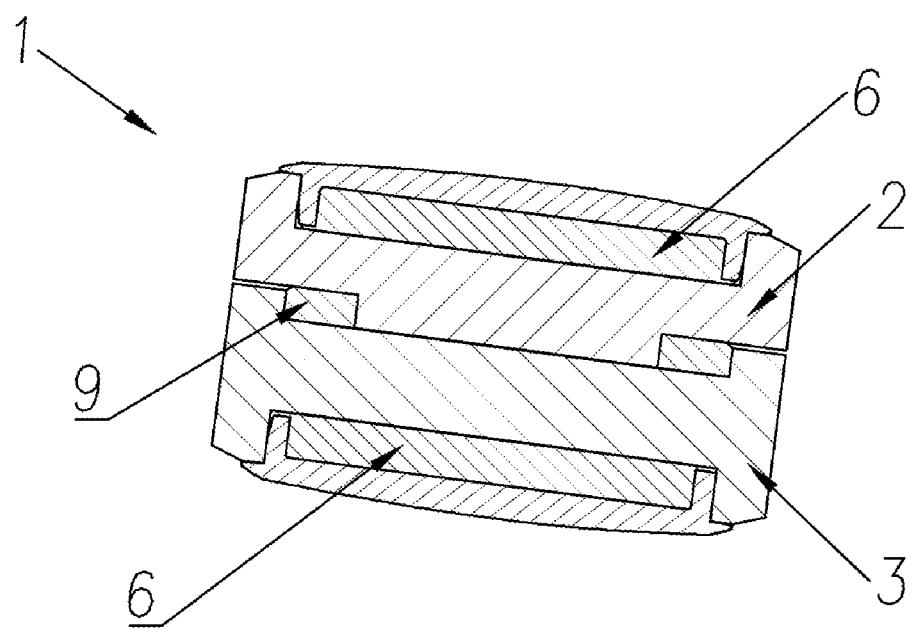

In FIGS. 11 and 12 the structure is shown in a displaced position, subjected to a vertical load W and a lateral load Q, prior to the impact condition of the composite sliding block (1) against the containment flanges (14) of the periphery of the concave sliding surfaces (13), in a situation in which the high friction interface is said to be inactive.

Figure 13:
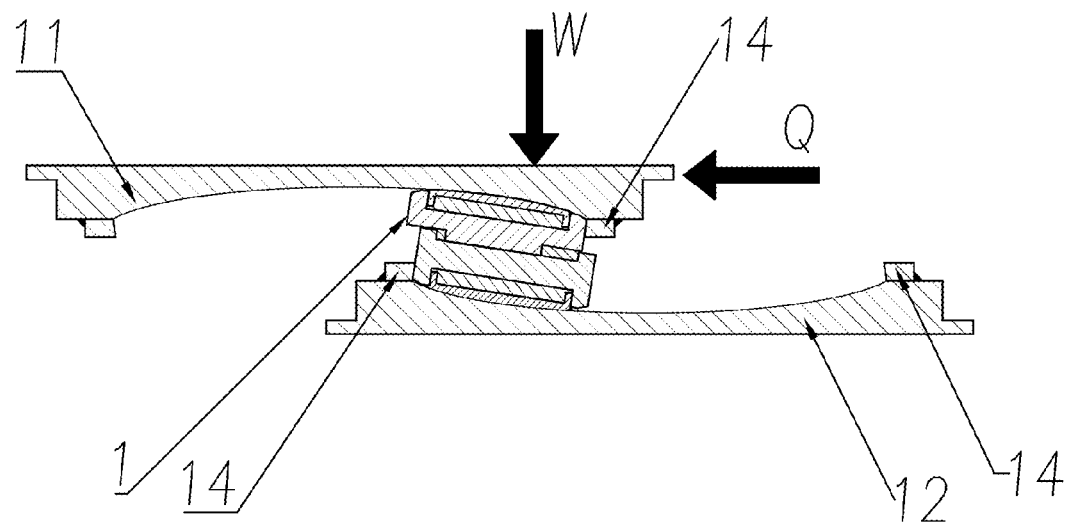
FIG. 13 is equivalent to FIG. 11 when the seismic isolator has reached the impact position against the containment flanges located on the periphery of the sliding surfaces, in which the high friction interface is activated.
Figure 14:
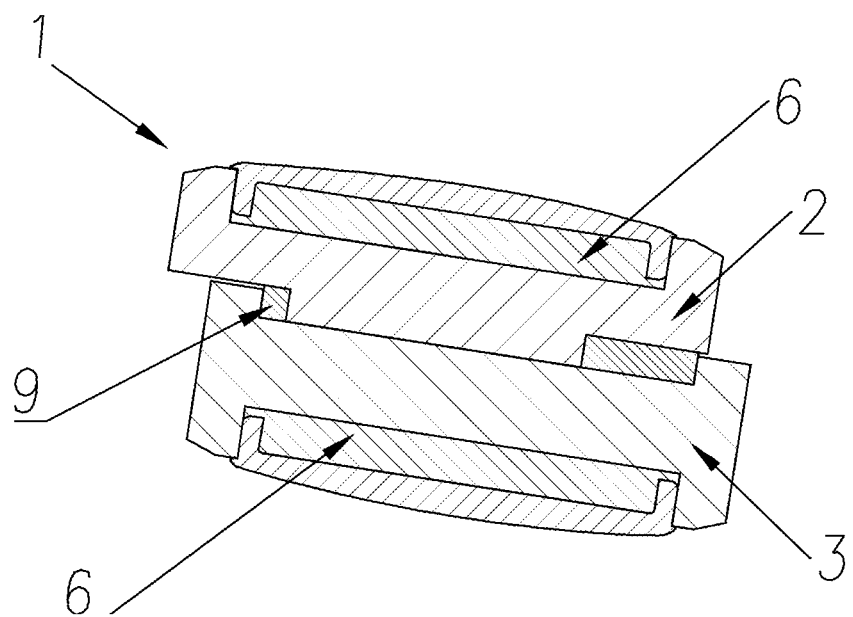

FIGS. 13 and 14 represent the condition of lateral impact of the composite sliding block (1) against the containment flanges (14), wherein forces are generated that induce the relative sliding of the upper and lower contact components at the high-friction interface or, in other words, wherein the high-friction interface is active. Under these conditions, the elastomeric seal (9) is laterally compressed, acting as a restorative element and preventing the metal-to-metal impact of the two contact components of the composite sliding block. In this way, the composite sliding block of the invention acts as a system that absorbs the impact in the lateral direction, dissipating energy by friction in the high-friction interface, and by lateral deformation of the elastomeric seal.

Figure 15:
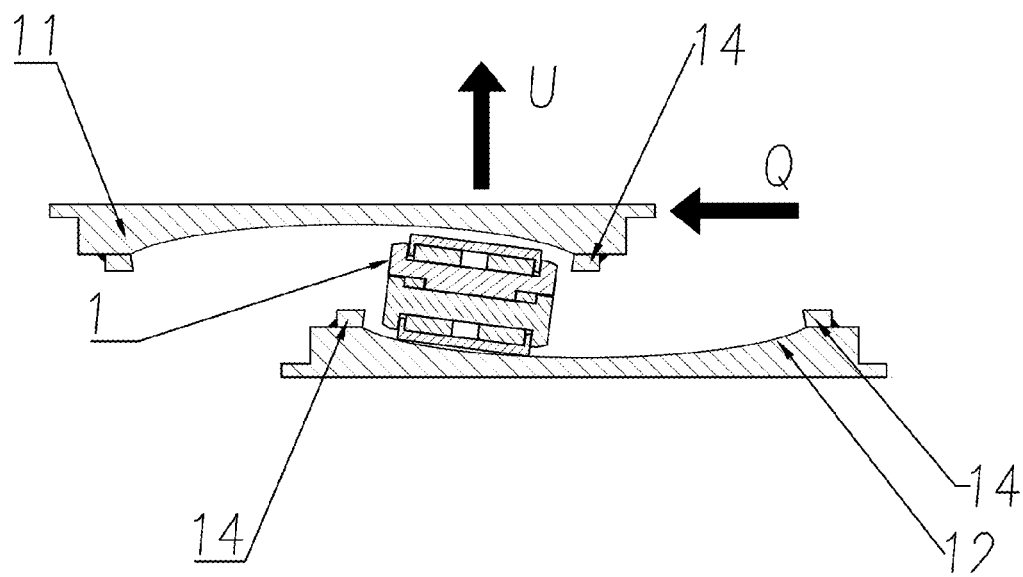
FIG. 15 is equivalent to FIG. 7 when the seismic isolator is in a displaced position due to being subjected to a horizontal load Q and, in addition, subjected to a vertical upwards load U, which produces a lifting of the support plate that is located on top of the composite sliding block.

FIG. 15 represents the lifting condition produced by an upward vertical load U caused by the independent or simultaneous action of the overturning moment and vertical acceleration of the ground. Note that the top support plate (11) loses contact with the composite sliding block (1), allowing the elastomeric compression supports to return to their original shape shown in FIG. 8. When the upper support plate (11) returns to rest on the composite sliding block (1), a condition that we call vertical impact, the elastomeric compression supports are compressed again occupying all the empty spaces of the niches, thus allowing to dampen the effect of the impact.

Figure 1:
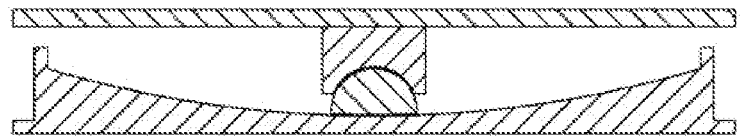
FIG. 1 shows the simple-curvature friction pendulum according to the prior art.
Figure 2:
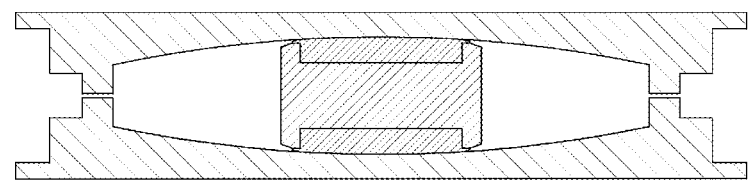
FIG. 2 shows the double-curvature friction pendulum according to the prior art.
Figure 3:
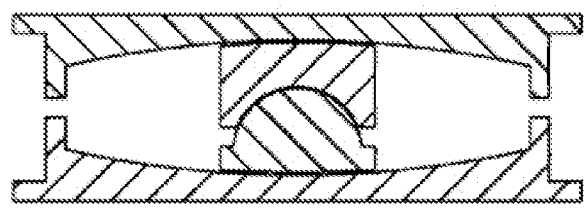
FIG. 3 shows the double-curvature friction pendulum with internal ball joint according to the prior art.
Figure 4:
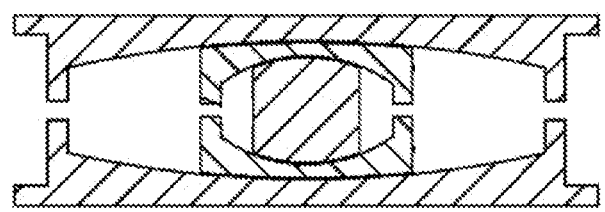
FIG. 4 shows the Triple Friction Pendulum Bearing (TFPB) according to the prior art.
Figure 16:
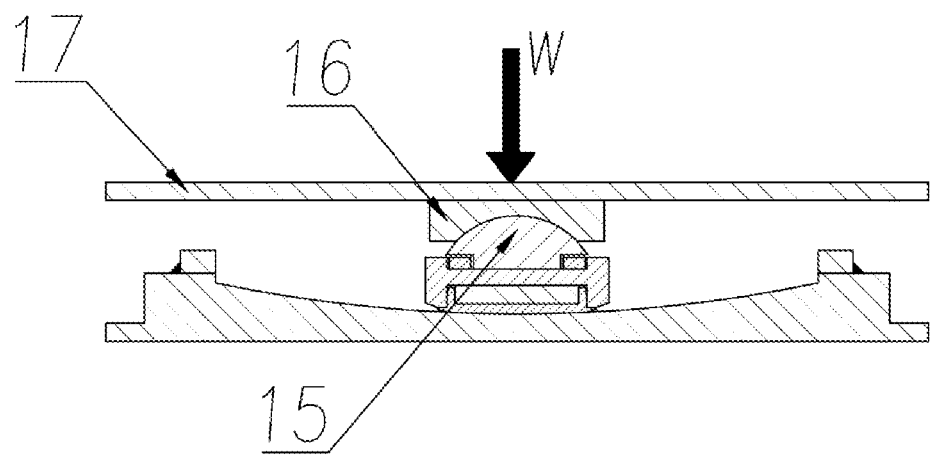
FIG. 16 represents a cross-sectional view along the vertical plane of symmetry of a friction-type seismic isolator with only one sliding surface, the composite sliding block of the invention being adapted to this other type of seismic isolator, wherein the seismic isolator is disposed in a centered position and subjected to a vertical load W.

Finally, FIG. 16 shows an application of the same composite sliding block of the invention but arranged in a friction-type isolator with a single sliding surface, similar to the one shown in FIG. 1 (prior art). The isolator is shown in its centered position and subjected to a vertical load W. Note that the external side of one of the contact components of the composite sliding block, in this case the contact component located above, is formed by a spherical cap (15) that acts as a low friction joint in rotary contact with at least one central portion with a concave spherical surface, of the upper support plate. More specifically, the upper support plate is comprised of a flat connection plate (17) joined on one side to the superstructure and joined on the other side to a protruding intermediate plate (16), wherein the end of the protruding intermediate plate is provided with said at least one central portion with a spherical concave surface. Clearly, instead of the upper contact component it could be the lower contact component that comprises the spherical cap and is in articulated low-friction contact with the lower support plate and it could be the lower support plate that comprises a flat connecting plate and a protruding intermediate plate with a central portion with a concave spherical surface in rotary contact with said spherical cap.

All the elements (the spherical cap and plates) are preferably made of metal, more preferably carbon steel, and the flat connecting plate and intermediate plate are preferably joined by welding.

The invention claimed is:

1. A composite sliding block for friction-type seismic isolators which are mounted between a superstructure and either a substructure or a foundation and which comprise two sliding surfaces, the friction-type seismic isolators further comprising two support plates, one of the two support plates having one of said two sliding surfaces at a lower side thereof and being connected to the superstructure at an upper side thereof and the other one of the two support plates having the other of said two sliding surfaces at an upper side thereof and being connected to the substructure or a foundation at a lower side thereof, wherein the composite sliding block is arranged between the two support plates and in sliding contact with each of the support plates, wherein the composite sliding block is formed by two contact components disposed one on top of the other, each contact component of the two contact components having an external side and an internal side, wherein said internal sides face each other, wherein through said external sides the sliding block exerts said sliding contact with each of the two support plates and through said internal sides facing each other the two contact components are omnidirectionally slidingly coupled to each other by means of a vertical male coupling projection of one of the two contact components inserted in a female coupling recess of the other contact component, the female coupling recess having a shape that matches the shape of the vertical male coupling projection and having a cross-sectional area that is larger than a cross-sectional area of the vertical male coupling projection, whereby there is an empty space surrounding the vertical male coupling projection within the female coupling recess, said empty space being occupied by an elastomeric seal capable of being laterally compressed by an effect of a relative displacement between the two contact components when the friction-type seismic isolator is subject to a lateral load, wherein the composite sliding block further comprises a sliding plate on the external side of each of the two contact components, wherein the sliding plate is accommodated in a corresponding niche on said external side of each of the two contact components, wherein each of the niches has a bottom and side walls and wherein in between each of the sliding plates and the bottom of each of the niches there is disposed, confined, an elastomeric compression support that is deformable with vertical loads exerted on the friction-type seismic isolator.

2. The composite sliding block of claim 1, wherein the composite sliding block has a substantially cylindrical shape, with the vertical male coupling projection and the female coupling recess also being cylindrical, each of the sliding plates having a circular shape and the elastomeric seal having a shape of a ring.

3. The composite sliding block of claim 1, wherein the female coupling recess has a bottom and side walls and a non-adhering sheet is arranged on said bottom of the female coupling recess to prevent the two contact components from adhering to each other.

4. The composite sliding block of claim 3, wherein the non-adhering sheet is made of a metal or non-metal with a friction coefficient of between 0.20 and 0.50, and having resistance to abrasion.

5. The composite sliding block of claim 1, wherein the two contact components are made of steel.

6. The composite sliding block of claim 1, wherein the elastomeric compression support and the elastomeric seal are made of natural rubber.

7. The composite sliding block of claim 1, wherein the sliding plates are made of a polymeric material comprising polytetrafluoroethylene (PTFE) or ultra-high molecular weight polyethylene (UHMWPE).

8. A friction pendulum-type seismic isolator that is mounted between a superstructure and either a substructure or a foundation and has two concave sliding surfaces, wherein the friction pendulum-type seismic isolator comprises:
   a first support plate with an upper side joined to the superstructure and a lower side provided with one of the two concave sliding surfaces; and
   a second support plate with a lower side joined to the substructure or the foundations and an upper side provided with the other of the two concave sliding surfaces,
   wherein the friction pendulum-type seismic isolator further comprises a composite sliding block according to claim 1, located between the first support plate and the second support plate and in sliding contact with the two concave sliding surfaces of the first and second support plates.

9. The friction pendulum-type seismic isolator of claim 8, wherein each of the sliding plates of the composite sliding block has an outer face that has a spherical convex shape.

10. The friction pendulum-type seismic isolator of claim 8, wherein the two concave sliding surfaces of the support plates are elliptical.

11. The friction pendulum-type seismic isolator of claim 8, wherein the two support plates have containment flanges located on a periphery of the two sliding surfaces.

* * * * *